United States Patent [19]

Mitchell

[11] 4,227,038

[45] Oct. 7, 1980

[54] VIBRATION ISOLATOR CONNECTOR

[75] Inventor: James Mitchell, Regina, Canada

[73] Assignee: Saskatchewan Power Corporation, Regina, Canada

[21] Appl. No.: 878,986

[22] Filed: Feb. 17, 1978

[30] Foreign Application Priority Data

Mar. 18, 1977 [CA] Canada .................................. 274294

[51] Int. Cl.³ .............................................. H02G 7/14
[52] U.S. Cl. .................................................. 174/42
[58] Field of Search ........................... 174/42, 43, 44; 339/108 R, 109, 263 L, 264 L, 265 F, 266 L

[56] References Cited

U.S. PATENT DOCUMENTS

| 1,965,494 | 7/1934 | Goodrich | 174/42 |
| 2,078,967 | 5/1937 | Noyes | 174/42 |
| 2,216,705 | 10/1940 | Fowle | 174/42 X |
| 2,694,101 | 11/1954 | Shuhart | 174/42 |
| 3,073,887 | 1/1963 | McGavern | 174/42 |

Primary Examiner—Laramie E. Askin
Attorney, Agent, or Firm—Burns, Doane, Swecker & Mathis

[57] ABSTRACT

This invention is directed to a vibration isolator connector which is useful in providing an electrical connection between a fixed apparatus and a suspended slender liner body which is subject to vertical vibration. The vibration isolator connector comprises a weight provided with connecting means for connecting an electrical conductor to said weight; and electrically conductive resilient suspension means connected to said weight for resiliently suspending said weight from a linear body and forming an electrical connection between said linear body and said connecting means on said weight.

10 Claims, 7 Drawing Figures

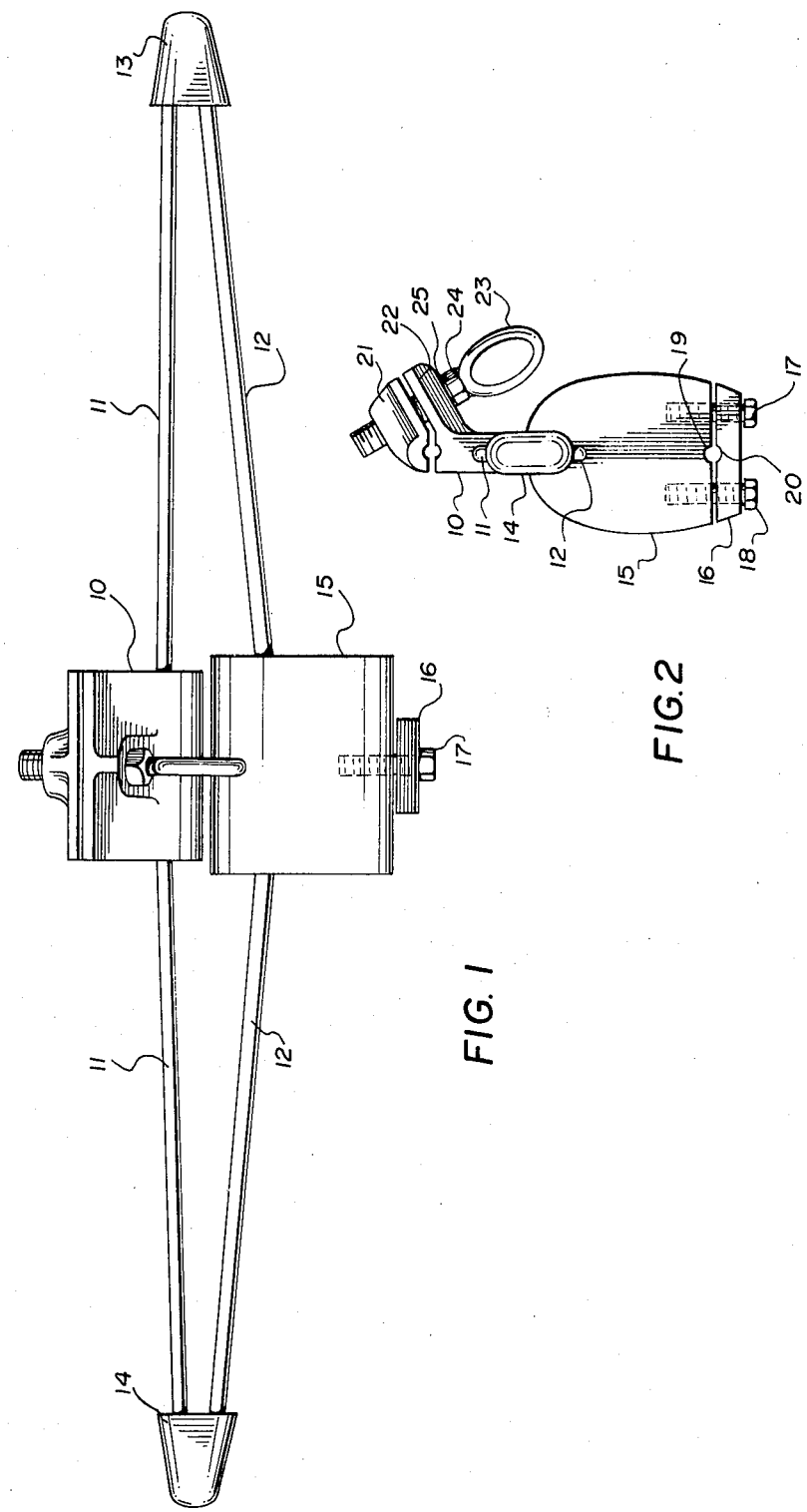

VIBRATION ISOLATOR CONNECTOR

FIELD OF THE INVENTION

This invention relates to electrical connectors for suspended linear conductors, such as overhead electrical transmission lines, and more particularly, to connectors which substantially isolate electrical connections from vertical vibrations of suspended linear conductors.

BACKGROUND OF THE INVENTION

It is well known that suspended linear circular cross-section bodies, such as overhead electrical transmission lines, are subject to vertical vibration. This may take the form of Aeolian vibration caused by moving air, such as wind, passing over the surfaces of the suspended bodies. When an electrical connection is made to an overhead conductor by conventional means, particularly when the connection is to fixed apparatus, vertical vibration of the conductor, if sufficiently severe, may induce fatigue failure of the connection. Also, sufficient energy may be imparted to other components near the connection to cause failure due to stresses produced by sympathetic motion. Experience has shown this to be a troublesome problem on electrical transmission lines subject to severe vibratory motion.

SUMMARY OF THE INVENTION

The present invention is directed to a vibration isolator connector for use in providing an electrical connection between fixed apparatus and a suspended linear body, such as an overhead electrical transmission line, which connector will substantially isolate the electrical connection to the fixed apparatus from vertical vibration, such as Aeolian vibration, of the suspended linear body.

Specifically, the vibration isolator connector comprises a weight provided with connecting means for connecting an electrical conductor to the weight, and electrically conductive resilient suspension means connected to the weight for resiliently suspending the weight from a linear body and forming an electrical connection between the linear body and the connecting means on the weight. The connector is designed to have a natural frequency of vibration substantially lower than the expected frequencies of vibration of the overhead conductor with which it is intended to be used.

The operation of the connector follows the established laws of Newton, that is, the counterweight is designed to afford a very much reduced amount of motion relative to the conductor to which it is attached. It is upon this principle that a high degree of vibration isolation is afforded; consequently, the reliability factor of the associated apparatus is raised considerably.

The vibration isolator connector can additionally comprise mounting means secured and electrically connected to the electrically conductive resilient suspension means for mechanically and electrically connecting the electrically conductive resilient suspension means to a linear body.

The electrically conductive resilient suspension means can comprise: a first resilient member extending longitudinally and connected, substantially at its centre, to the mounting means; a second resilient member extending longitudinally substantially the same length and in the same direction as the first resilient member, and connected substantially at its centre to the weight; a portion of the first resilient member substantially at one end of the first resilient member being connected to a portion of the second resilient member substantially at the corresponding end of the second resilient member, and a portion of the first resilient member substantially at the other end of the first resilient member being connected to a portion of the second resilient member substantially at the other end of the second resilient member; and wherein the weight suspended from the central portion of the second resilient member is sufficiently heavy that when the vibration isolator connector is suspended from the linear body by means of the mounting means, the downward biasing force of the weight causes the first and second resilient members to flex transversely so that the central portion of the second resilient member and the weight suspended therefrom are separated from the central portion of said first resilient member and the mounting means attached thereto. This provides a gap between the mounting means and the weight to enable the weight to vibrate at a reduced frequency and/or amplitude in relation to the linear body. The dimensions and specifications of the component parts of the connector are chosen so as to make the gap sufficiently large to prevent contact between the mounting means and the weight during operation.

In the vibration isolator connector, one end portion of the first resilient member can be rigidly connected to one end portion of the second resilient member, and the other end portion of the first resilient member can be rigidly connected to the other end portion of the second resilient member.

The first and second resilient members can be constructed of high tensile galvanized steel messenger cable. The mounting means can be made up of a hot-line conductor clamp pressed onto the central portion of the first resilient member. An extra flexible conductor running from the vibration isolator connector to an external apparatus can be installed as required.

The hot-line conductor clamp can be constructed of a first clamping member, a second clamping member which co-operates with the first clamping member to provide a clamping action, and a hot stick ring connected to a bolt which holds the first and second clamping members together. The weight can be pressed onto the central portion of the second resilient member and the connecting means connecting the electrical conductor to the weight can be held by a plate bolted to the weight.

The invention also comprises a method for forming an electrical connection between a suspended electrical conductor and a fixed apparatus comprising: attaching a vibration isolator connector to the suspended electrical conductor; and connecting the fixed apparatus to the connecting means on the weight of said vibration isolator connector by means of a flexible conductor.

DRAWINGS

In the drawings:

FIG. 1 is a side elevational view of a vibration isolator connector constructed in accordance with the invention;

FIG. 2 is an end elevational view of the vibration isolator connector of FIG. 1;

DETAILED DESCRIPTION OF THE INVENTION

Figure 3:
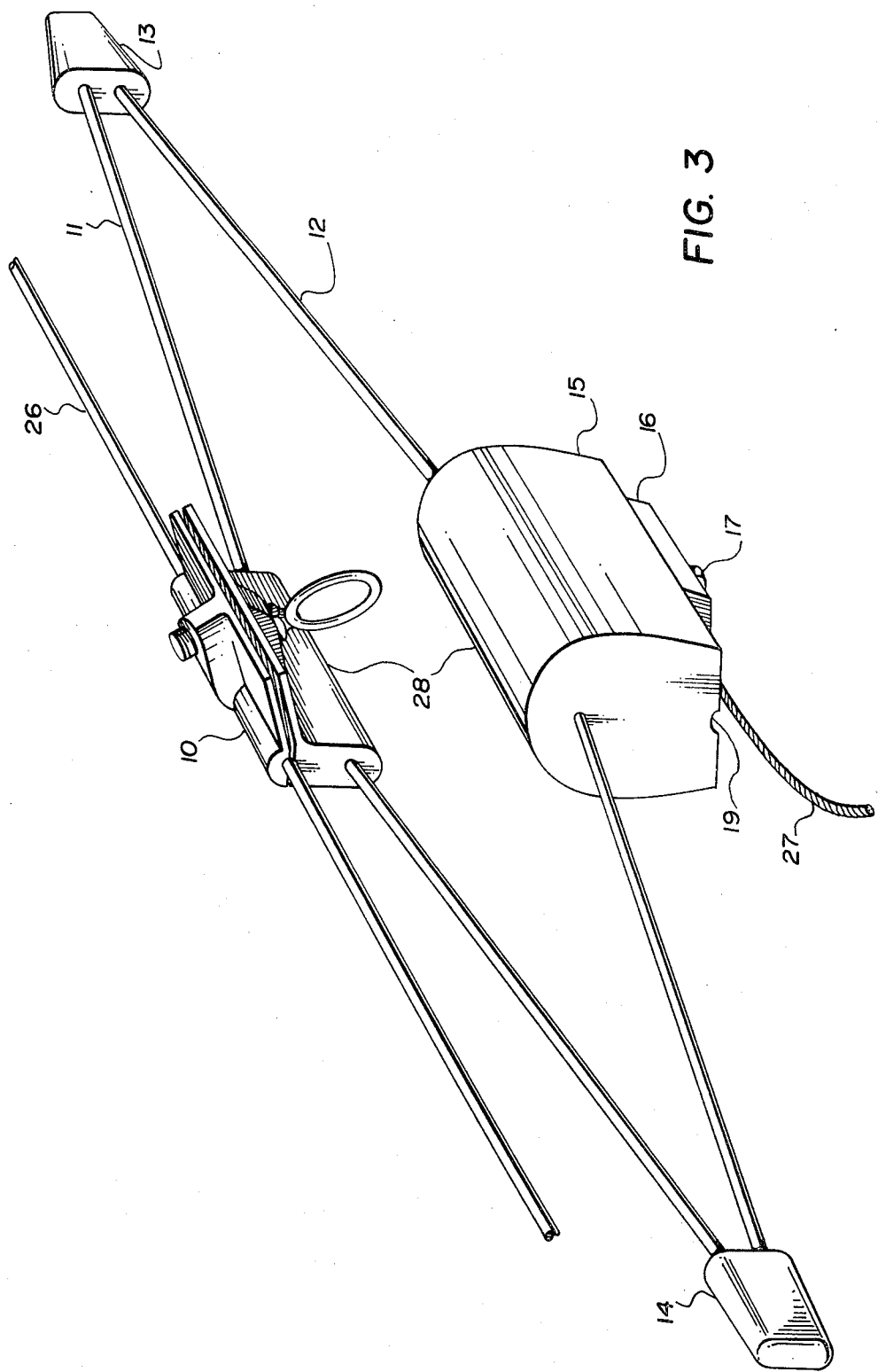
FIG. 3 is a perspective view of the vibration isolator connector of FIGS. 1 and 2 mounted on an overhead conductor and connected to a flexible conductor.

As can be seen in FIG. 1, an upper resilient member 11, with its ends sloping downwardly, and a lower resilient member 12, with its ends sloping upwardly, are connected together to form a horizontally elongated generally diamond-like shape. The two horizontally remote meeting ends of the upper and lower resilient members 11 and 12 are connected by two end caps 13 and 14. The end caps 13 and 14 are each pressed onto the respective ends of the resilient members 11 and 12. The resilient members 11 and 12 can be made of high tensile galvanized steel messenger cable. The end caps 13 and 14 can be aluminum.

A weight 15 is pressed onto the central portion of the resilient member 12. The weight 15 is provided on its underside with a plate 16 which is secured to the underside of the weight 15 by two bolts, one of which is shown as 17 in FIG. 1. The two bolts penetrate through two holes in the plate 16 and are screwed into threaded holes in the underside of weight 15. The central portion of the upper resilient member 11 has pressed thereon a hot line conductor clamp 10.

As shown in FIG. 2, the bottom surface of weight 15 and top surface of plate 16 are provided with matching but opposed centrally located longitudinal grooves 19 and 20 which are in alignment with each other when the plate 16 is secured to the weight 15 by means of the bolts 17 and 18. The bolts can be secured with washers.

The hot line connector clamp 10, as can be seen in FIG. 2, is constructed in five pieces; an upper clamp member 21, a lower clamp member 22, a hot stick ring 23 which is connected to a clamp bolt 24, and a lock washer 25. The distance between the upper clamp member 21 and the lower clamp member 22, can be adjusted by tightening or loosening the bolt 24. The bottom surface of the upper clamp member 21 and the top surface of the lower clamp member 22 have longitudinal grooves which co-operate with one another so that the overall clamp 10 can be securely connected to a suspended hot line conductor such as a high voltage transmission line.

FIG. 3 illustrates how the vibration isolator connector can be connected to and suspended from a linear electrical conductor 26 by clamp 10. The downward force exerted by the weight 15 causes a gap 28 to be formed between the clamp 10 and the weight 15. The end portion of a flexible conductor 27 is connected to the weight 15 by being clamped in the aperture formed by grooves 19 and 20. Flexible conductor 27 can be an extra flexible copper conductor. In a typical application, the other end of flexible conductor 27 would be connected to a fixed apparatus to complete the desired electricl connection between the fixed apparatus and the linear body 26.

Figure 4:
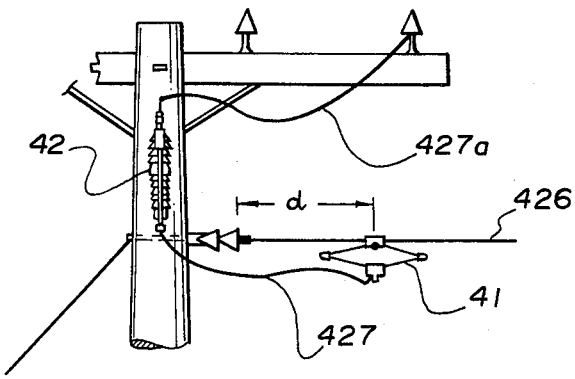
FIG. 4 is a side view of a typicl application of the vibration isolator connector.
Figure 5:
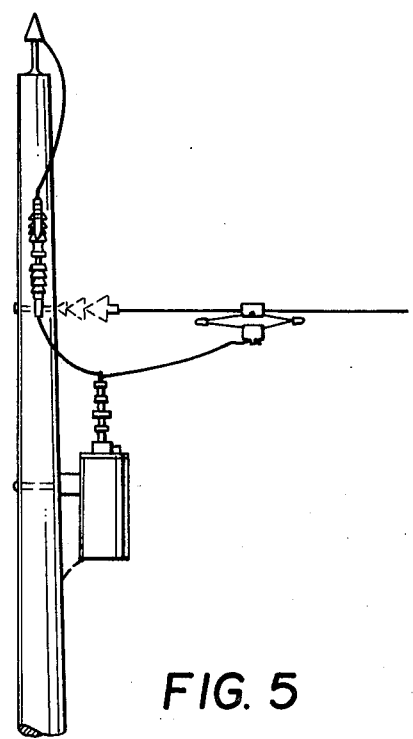
FIG. 5 is a side view of a second typical application of the vibration isolator connector.

FIGS. 4 and 5 illustrate two typical ways in which the vibration isolator connector can be used.

Figure 6:
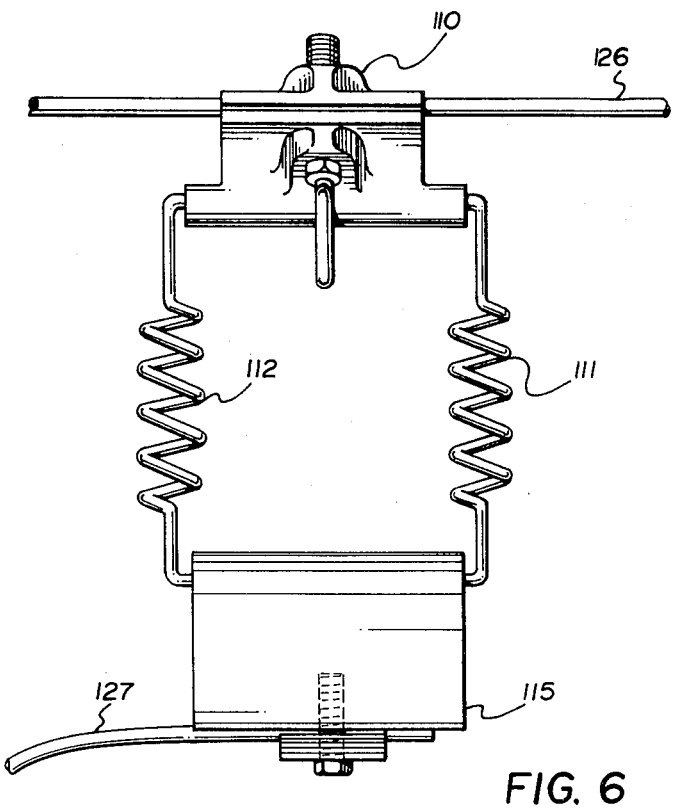
FIG. 6 is a side elevational view of an alternative design of vibration isolator connector mounted on an overhead conductor and connected to a flexible conductor.
Figure 7:
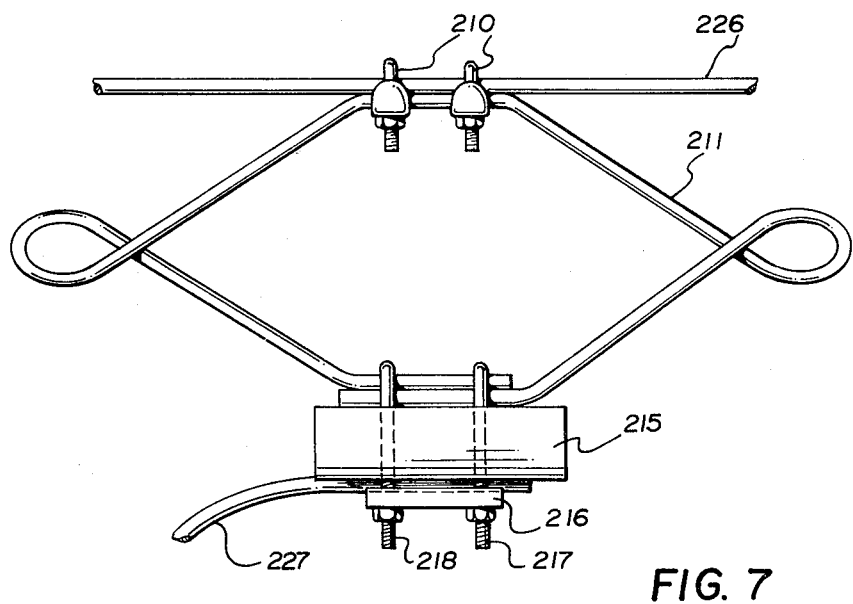
FIG. 7 is a side elevational view of a further alternative design of vibration isolator connector mounted on an overhead conductor and connected to a flexible conductor.

FIGS. 6 and 7 illustrate alternative designs of vibration isolator connectors.

EXAMPLE OF VIBRATION ISOLATOR CONNECTOR FOR A TYPICAL APPLICATION

The detailed dimensions of the component parts of the device will depend upon the requirements of the particular application. In a typical application, upper and lower resilient members 11 and 12 might respectively consist of twenty-four inch lengths of 0.25 inch high tensile galvanized steel messenger cable, and the total weight of the weight 15, plate 16 and bolts 17 and 18 might be three pounds. In any case, this weight must be fixed so as to provide an appropriate gap 28 between the top of the weight 15 and the bottom of the clamp 10 when the device is suspended as shown in FIG. 3, to avoid interference between the clamp 10 and the weight 15 during operation. For a device having the dimensions mentioned above, a gap of 1.5 to 2.5 inches would be appropriate. The clamp 10 weight would be less than one pound.

The length of weight 15 would be about $3\frac{1}{2}$ inches. The lengths of end caps 13 and 14 would be about $1\frac{1}{2}$ inches. The length of clamp 10 would be about 3 inches. There is no gap 28 when the connector is not suspended.

The operation of the vibration isolator connector follows well-known physical laws, in accordance with which, when the linear conductor body on which the connector is mounted (shown as 26 in FIG. 3) is subject to vertical vibration, the amplitude of vertical vibration of the weight 15 will be substantially less than that of the conductor body 26. Accordingly, the dimensions and specifications of the component parts of the connector must be chosen to make the natural frequency of vibration of the connector substantially lower than the expected frequencies of Aeolian vibration of the conductor on which it is to be mounted.

For example, for the 0.25 inch messenger cable mentioned above, with the dimensions discussed above, and a spring constant K=3.75 lb/in; the natural frequency $f_o$ of the vibration isolator connector with a counterweight of 3 pounds (M=w/g=3 lb/386 in/sec$^2$) can be calculated according to the following equation:

$$f_o = 1/2\pi \sqrt{K/M} = 3.5 \text{ Hz}$$

This connector would operate satisfactorily for Aeolian frequencies greater than, say, 5 Hz. It was designed for conductors with diameters from about 0.15 to 0.5 inch. At an average wind velocity of 10 m.p.h. under bare wire conditions, the expected Aeolian vibration frequencies would be about 217 Hz. for a 0.15 inch conductor, and about 65 Hz. for a 0.5 inch conductor. It is not uncommon to have various classifications of frost (e.g. hoar, rime, ice glaze) adhere to the surface of a conductor, thereby increasing the effective diameter and decreasing the expected frequency. For example, a 0.125 inch coating of frost on a 0.15 inch conductor would produce an effective diameter of 0.4 inch, and an expected Aeolian frequency of about 82 Hz. for a 10 m.p.h. wind acting normal to the conductor. A 0.25 inch coating on a 0.5 inch conductor would result in an expected frequency of about 33 Hz. under the same wind conditions. It can be stated that a vibration isolator having a natural frequency such as 3.5 Hz. will operate satisfactorily over the expected range of frequencies likely to be encountered by conductors in the size range mentioned above.

The dimensions and weights given above are for a typical application and can be changed to suit specific requirements.

By installing the vibration isolator connector, the fatigue-inducing stresses to which the electrical connections of the flexible conductor 27 will be subjected will be substantially less than would be the case if the conductor 27 were connected directly to the body 26, and the stresses communicated via conductor 27 to the components of the fixed apparatus to which it is connected will be similarly reduced.

A typical application is illustrated in FIG. 4. A vibration isolator connector 41 is suspended from overhead conductor 426 and connected to fixed apparatus 42 by means of extra flexible conductor 427. A second extra flexible conductor 427a may be used to connect the fixed apparatus to another overhead conductor (not shown), by means of a second vibration isolator connector (not shown) if required. For a vibration isolator having the dimensions given in the specific example above, the distance d may be 22 inches. FIG. 5 illustrates a similar application.

Alternative embodiments of the vibration isolator connector are shown in FIGS. 6 and 7. In FIG. 6, the connector comprises a hot line clamp 110 pressed on to the upper ends of two coil springs 111 and 112. Weight 115 is pressed on to the lower ends of the two coil springs. Clamp 110 is shown mounted on a linear conductor 126, and a flexible conductor 127 is shown attached to weight 115.

In FIG. 7, the connector comprises a resilient electrically conductive member 211, which may consist of a spring-steel rod formed as shown, secured to a weight 215 by means of two U-bolts 217 and 218 which pass through holes in weight 215 and plate 216. The end portion of a flexible conductor 227 is shown connected to the weight by being clamped between the weight and the plate 216. The connector may be mounted on a linear conductor by clamping the central portion of resilient member 211 to the conductor by any suitable means. It is shown clamped to a linear conductor 226 by two conventional cable clamps 210.

A vibration isolator connector constructed according to FIG. 1 and having resilient members 11 and 12 composed of high-tensile galvanized steel messenger cable is preferred to the embodiments shown in FIGS. 6 and 7 since it will possess superior vibration-damping qualities.

While particular embodiments of the present invention have been shown and described, it is apparent that various changes and modifications may be made, and it is therefore intended in the following claims to cover all such obvious modifications and changes as may fall within the true spirit and scope of this invention.

What I claim is:

1. A vibration isolator connector providing an electrical connection between a fixed apparatus and a suspended linear electrically conductive body, comprising:
   a vibration absorbing and reducing weight electrically connected to the fixed apparatus by a connector attached to the weight; and
   electrically conductive energy absorbing resilient suspension means connected to the weight, which suspension means resiliently suspends and separates the weight from the linear electrically conductive body and forms an electrical connection between the linear body and the connector attached to the weight.

2. A vibration isolator connector providing an electrical connection between a fixed apparatus and a suspended linear electrically conductive body as defined in claim 1 further comprising mounting means secured and electrically connected to the electrically conductive resilient suspension means, which mounting means mechanically and electrically connects the electrically conductive resilient suspension means to the linear body.

3. A vibration isolator connector comprising:
   a vibration absorbing and reducing weight provided with connecting means for connecting an electrical conductor to the weight;
   electrically conductive energy absorbing resilient suspension means connected to the weight for resiliently suspending and separating the weight from a linear electrically conductive body and forming an electrical connection between the linear body and the connecting means on the weight;
   mounting means which is secured and electrically connected to the electrically conductive energy absorbing resilient suspension means for mechanically and electrically connecting the electrically conductive energy absorbing resilient suspension means to the linear body;
   said electrically conductive energy absorbing resilient suspension means including a first resilient member extending longitudinally and connected, substantially at its centre, to the mounting means;
   said electrically conductive energy absorbing resilient suspension means also including a second resilient member extending longitudinally substantially the same length and in the same direction as the first resilient member, and connected substantially at its centre to the weight;
   a portion of the first resilient member substantially at one end thereof being connected to a portion of the second resilient member substantially at the corresponding end of the second resilient member, and a portion of the first resilient member substantially at the other end of the first resilient member being connected to a portion of the second resilient member substantially at the other end of the second resilient member; and
   wherein the weight connected to the central portion of the second resilient member is sufficiently heavy that when the vibration isolator connector is suspended from the linear body by the mounting means, the downward biasing force of the weight causes the first and second resilient members to flex transversely so that the central portion of the second resilient member and the weight connected thereto are separated in space from the central portion of the first resilient member and the mounting means connected thereto.

4. A vibration isolator connector as defined in claim 3 wherein one end portion of the first resilient member is rigidly connected to one end portion of the second resilient member, and the other end portion of the first resilient member is rigidly connected to the other end portion of the second resilient member.

5. A vibration isolator connector as defined in claim 4 wherein the first and second resilient members are constructed of high tensile galvanized steel messenger cable.

6. A vibration isolator connector as defined in claim 5 wherein the mounting means comprises a hot-line conductor clamp pressed onto the central portion of the first resilient member.

7. A vibration isolator connector as defined in claim 6 wherein the hot-line conductor clamp is constructed of a first clamping member, a second clamping member which co-operates with the first clamping member to provide a clamping action, and a hot stick ring connected to a bolt which holds the first and second clamping members together.

8. A vibration isolator connector as defined in claim 5, 6 or 7 wherein the weight is pressed onto the central portion of the second resilient member and the connecting means for connecting an electrical conductor to the weight comprises a plate bolted to the weight.

9. A method of making an electrical connection between fixed apparatus and a suspended linear conductor comprising the steps of:
  resiliently suspending a weight from the linear conductor through an electrically conductive, resilient member connected to the linear conductor and the weight;
  connecting a flexible, electrical conductor between the weight and the fixed apparatus such that the flexible, electrical conductor is electrically connected through the weight and the resilient member to the suspended linear conductor.

10. A connector providing an electrical connection between a fixed apparatus and a suspended electrical transmission line while isolating vibrations of the transmission line from the electrical connection to the fixed apparatus, the connector comprising:
  a weight;
  means for resiliently suspending said weight from the transmission line, the suspending means being electrically conductive and including mounting means, which mounting means effects a mechanical and an electrical connection to the transmission line;
  an electrical connector on said weight providing an electrical connection between said weight and the fixed apparatus, the electrical connector being electrically connected to said suspending means, whereby said weight and suspending means absorb vibrations of the transmission line and isolate the electrical connector from transmission line vibrations.

* * * * *